(12) United States Patent
Sagfors

(10) Patent No.: US 7,689,237 B2
(45) Date of Patent: Mar. 30, 2010

(54) ENHANCED TRANSMISSION QUALITY IN PUSH-TO TALK SYSTEM

(75) Inventor: Mats Fredrik Sagfors, Kyrkslatt (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 840 days.

(21) Appl. No.: 10/599,850

(22) PCT Filed: Apr. 15, 2004

(86) PCT No.: PCT/SE2004/000587

§ 371 (c)(1),
(2), (4) Date: Oct. 11, 2006

(87) PCT Pub. No.: WO2005/101877

PCT Pub. Date: Oct. 27, 2005

(65) Prior Publication Data

US 2008/0268890 A1  Oct. 30, 2008

(51) Int. Cl.
*H04B 7/00* (2006.01)
*H04Q 7/20* (2006.01)

(52) U.S. Cl. .............. 455/518; 455/463; 455/519; 370/260; 370/235

(58) Field of Classification Search ......... 455/517–520, 455/445, 463, 563, 90.2; 370/260, 329, 342, 370/328, 401, 235, 516, 517, 522, 352
See application file for complete search history.

(56) References Cited

U.S. PATENT DOCUMENTS 6,721,573 B2 * 4/2004 Silvestri ............. 455/463

2003/0016632 A1  1/2003  Refai (Continued)

FOREIGN PATENT DOCUMENTS

WO  WO 03015358 A2  2/2003

(Continued)

OTHER PUBLICATIONS

Darilion K. et al; Networks 2003 ICON2003 The 11$^{th}$ IEEE International Conference on Oct. 1, 2003 Event-based radio Communication signaling using the session initiation protocol pp. 489-494 see section I, IV.

*Primary Examiner*—Sujatha Sharma
(74) *Attorney, Agent, or Firm*—Roger S. Burleigh

(57) ABSTRACT

The present invention relates to methods and arrangements to enhance transmission quality in a Push-to-Talk system comprising a sending mobile unit MB1, and a receiving mobile unit MB2 used by a receiving subscriber B. The receiving unit MB2 comprises a Play-Out-Buffer POB and a Repeat Buffer RB, whereby a stream of sequences 15-19,25-29,35-39 is sent from the sending unit MB1 to the receiving unit MB2. The method comprises the following steps:—The incoming stream of sequences 15-19,25-29,35-39 is collected into the Repeat Buffer RB and into the Play-Out-Buffer POB. The Play-Out-Buffer has a storage size and a point for commencing play-out that provides low voice delay, and the Repeat Buffer has a storage size that provides high sound quality. —The incoming stream is played-out from the Play-Out-Buffer POB to the receiving subscriber B. —Replay is commenced of a defined part 36-39 of the sequences 15-19,25-29,35-39 collected in the Repeat Buffer RB.

17 Claims, 5 Drawing Sheets

U.S. PATENT DOCUMENTS

2003/0031210 A1* 2/2003 Harris ........................ 370/516
2006/0088000 A1* 4/2006 Hannu et al. ................. 370/328
2007/0291744 A1* 12/2007 Lundberg et al. ........... 370/352
2008/0026756 A1* 1/2008 Harris et al. ................. 455/436

FOREIGN PATENT DOCUMENTS

WO    WO 2004014050 A1    2/2004

* cited by examiner

ENHANCED TRANSMISSION QUALITY IN PUSH-TO TALK SYSTEM

TECHNICAL FIELD OF THE INVENTION

The present invention relates to methods and arrangements to enhance transmission quality in a Push-to-Talk system that comprises a sending mobile subscriber and a receiving mobile subscriber whereby a stream of sequences is sent from the sending to the receiving mobile subscriber.

DESCRIPTION OF RELATED ART

In Push-to-Talk over Cellular PoC, cellular radio access networks and mobiles are used in a walkie-talkie-like fashion. It facilitates e.g. one-to-one and one-to-many communication, where one user (in a group) can talk at a time.

The delay requirements on the PoC service is somewhere between "Conversational" (time-critical) and streaming/background (not (as) time-critical). Typically, an end user would expect a response to his talk burst in a few seconds after it has been sent. Requirements include e.g. that voice delay from a sender to a receiver should be no more than 1.6 seconds during a session.

Current radio access resource allocation schemes are typically allocating radio resources for a user based on some estimate of e.g. the link bit-rate demand. This means that there may be a certain degree of "inertia" before the radio access bearer resources are allocated and the data can be transmitted. This is true e.g. for Wideband Code Division Multiple Access WCDMA, where a dedicated channel DCH is typically allocated for each user. This inertia adds to the delay of the talk burst. Note also that the data accumulated in radio bearer buffers may result in severe burst of data once the DCH channel is allocated. This data has to be handled by a play-out buffer—once it arrives to the receiver. Radio Access bearer towards the Packet Switched domain are typically realized using Acknowledged Mode to achieve resource efficient transmission and bit-exact delivery of the data. The drawback of the acknowledge mode is the fact that it introduces delay jittering, as erroneous data have to be re-transmitted over the air. To summarise, guaranteeing a good play-out quality comes at the expense of additional delay.

SUMMARY OF THE INVENTION

The present invention solves problems related to guaranteeing a good play-out quality of a stream of sequences without the expense of excessive delay. More specific:

A low voice delay from sender to receiver would call for a short initial buffering period before play-out is commenced. However, a too short initial buffering period may result in that the buffer is drained due to the jittering introduced by the radio access realization. A drained play out buffer leads to play-out interruptions and reduced subjective quality.

A long initial buffering period can guarantee good play-out quality. However, the cost comes as an increased delay. The conversational pattern in PoC may then suffer.

The problems are solved by the invention by using a reasonable short buffering period for the incoming stream of sequences before play-out is commenced, and by collecting in parallel the incoming stream into a buffer having a size that guarantees an improved play-out quality. The collected stream can be re-played at request with high play-out quality.

More in detail the problems are solved by the invention by a method comprising a sending mobile unit, and a receiving mobile unit used by a receiving subscriber. The receiving unit comprises a Play-Out-Buffer and a Repeat Buffer. A stream of sequences is sent from the sending mobile unit to the receiving mobile unit. The method comprises the following further steps:

The incoming stream of sequences is collected into the Repeat Buffer and into the Play-Out-Buffer. The Play-Out-Buffer has a storage size and a point for commencing play-out that provides low voice delay while the Repeat Buffer has a storage size that provides high sound quality.

The incoming stream is played-out from the Play-Out-Buffer to the receiving subscriber.

Replay is commenced of a defined part of the sequences collected in the Repeat Buffer (RB).

An advantage with the invention is that low voice delay is possible.

Another advantage is that "perfect" quality can be achieved on request.

Yet another advantage is that unnecessary "I beg your pardon" transactions can be avoided, as the receiving user can repeat the last burst(s) locally.

Yet another advantage is that off-line play-out of an earlier conversation sequence can be achieved.

The invention will now be described more in detail with the aid of preferred embodiments in connection with the enclosed drawings.

DETAILED DESCRIPTION OF EMBODIMENTS

Figure 1:
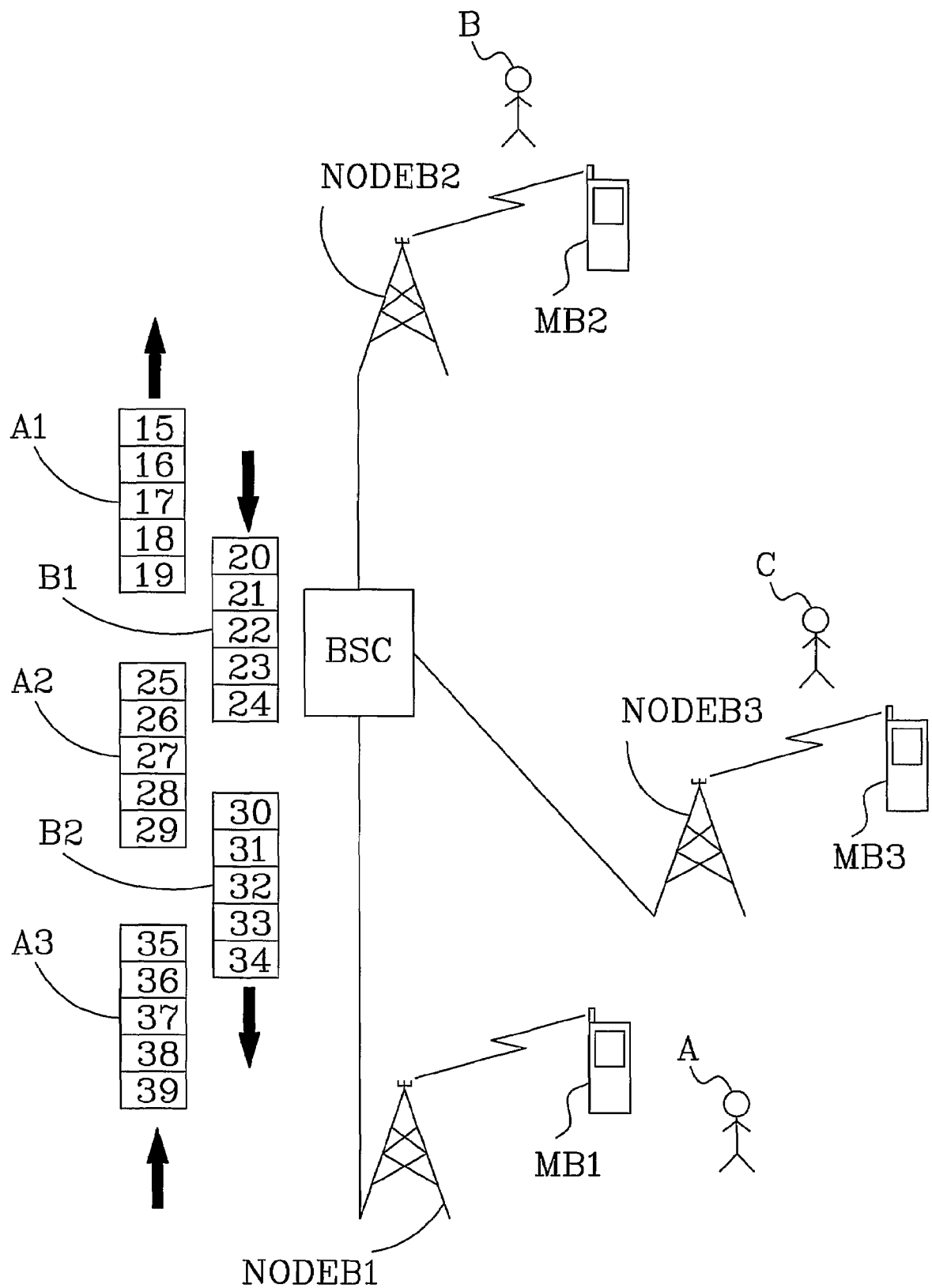
FIG. 1 shows a block schematic illustration of a Push-to-Talk system involving a group of subscribers.

FIG. 1 discloses a Push-to-Talk over Cellular system PoC that involves three subscribers A, B, C. Each subscriber A, B and C uses a mobile unit. Mobile unit MB1 is used by A, MB2 by B and MB3 by C. In this example the cellular system is a Wideband Code Division Multiple Access WCDMA system. A Radio Network Controller RNC in the WCDMA system handles the control of base stations NODEB1, NODEB2 and NODEB3. MB1 is located within NODEB1's cell area, MB2 within NODEB2's cell area and MB3 within NODEB3's cell area. Bursts A1-A3 and B1-B2 are sent alternately between MB1 and MB2 via the base stations NODEB1 and NODEB2. The bursts comprise sequences 15-19(=A1), 25-29(=A2), 35-39(=A3) and 20-24(=B1), 30-34 (=B1). A1-A3 is sent from MB1 to MB2, and B1-B2 is sent from MB2 to MB1. The alternately transmission A1/B1/A2/B2/A3 follows walkie-talkie praxis, i.e. only one speaker at a time. The bursts in this example are speech bursts. Each burst comprises five sequences i.e. packages within the burst.

Figure 2:
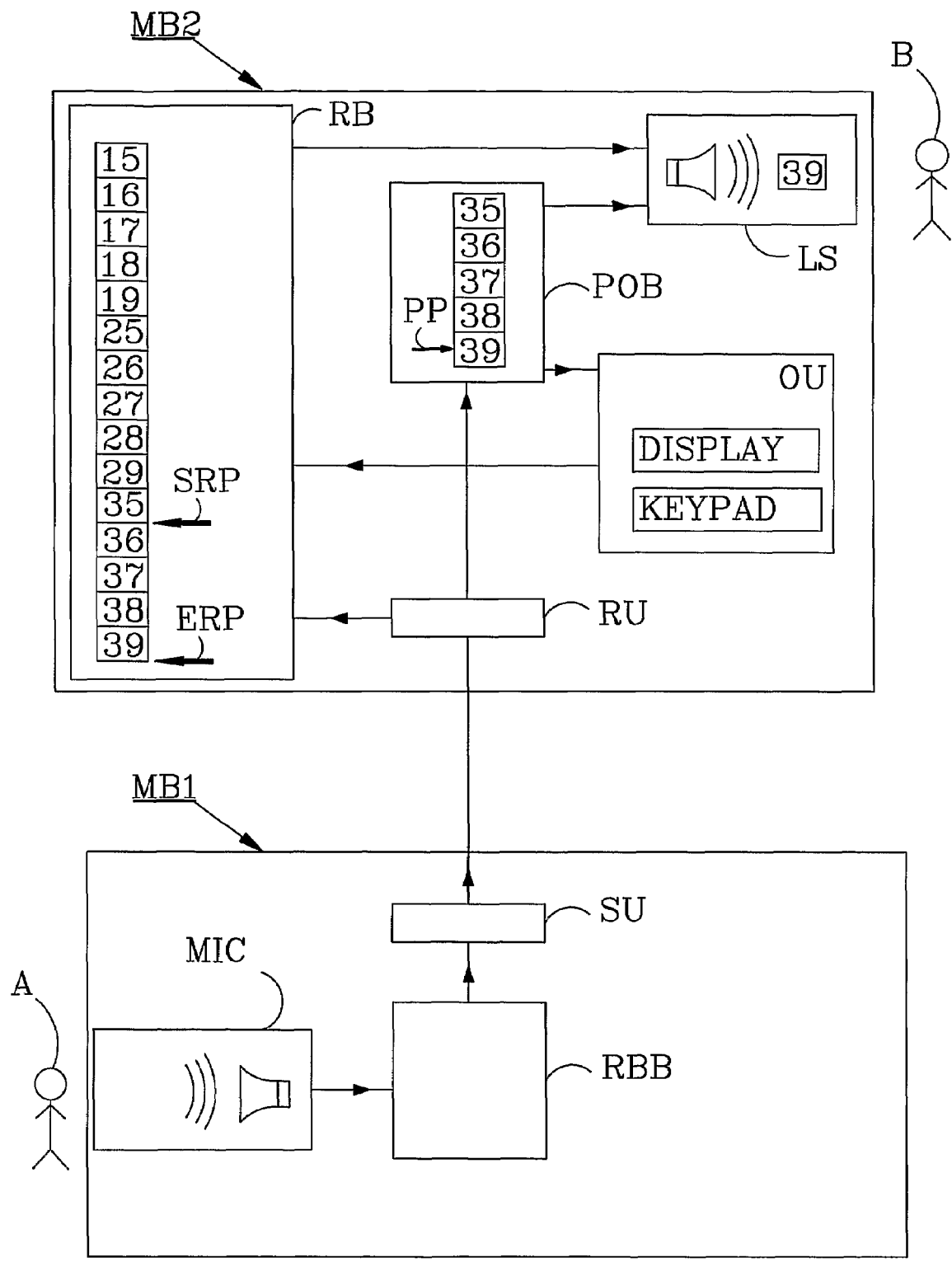
FIG. 2 shows a block schematic illustration of two mobile units in a Push-to-Talk system.

FIG. 2 discloses the mobile units MB1 and MB2 that already have been shown in FIG. 1. The mobile unit MB1 comprises a microphone MIC. The microphone receives speech from subscriber A. The Bursts are composed out of received speech sequences in a radio bearer buffer RBB in MB1 and sent from a sending unit SU in MB1 to a receiving unit RU in the mobile station MB2. The mobile unit MB2 has in FIG. 2 already received the bursts A1-A3 that have been seen in FIG. 1.

The mobile unit MB2 comprises a Play-Out Buffer POB that is of type First-In-First-Out. The incoming sequences are received to the receiving unit RU in the mobile unit MB2. The sequences 35-39 are stored in the Play-Out Buffer POB and in parallel the same sequences 35-39 are stored in a Repeat Buffer RB. The Repeat Buffer RB, which also is of type First-In-First-Out has a size that is large compared to the size of the Play-Out-Buffer POB. The Repeat Buffer RB hereby provides high sound quality due to its large size while the Play-Out-Buffer POB provides low voice delay due to its small size, i.e. due to a short initial buffering period before play-out is commenced. As can be seen in FIG. 2, the sequences 15-29 have already been stored in the Repeat Buffer before storage of the last sequences 35-39. In this example, the number of memory positions in POB is fifteen while the number of memory positions in RB is five. A Play-out Pointer PP in POB points at a sequence 39 which is the sequence that at the moment is being played-out from a loudspeaker LS to the B-subscriber. A Start Repeat Pointer SRP in the Repeat Buffer RB points at a start position of a requested repeat session. Another pointer, a so called End Repeat Pointer ERP points at a location in the repeat buffer where a repeat session is requested to end. This will be further explained later in the description when a method according to the invention is described.

The mobile unit MB2 comprises an Operation Unit OU that comprises a DISPLAY and a KEYPAD. The Operation Unit is connected to the Play-Out-Buffer POB and to the Repeat Buffer RB. The user of the unit MB2, i.e. the B-subscriber, can influence the Operation Unit. When a specified button on the KEYPAD is pressed, the End Repeat Pointer ERP will move to a memory location in the repeat buffer RB that corresponds to a sequence that at the moment is being played-out and listened to by the subscriber.

A method according to a first embodiment of the invention will now be explained. The description of the method is to be read together with the earlier described FIGS. 1 and 2. The method presumes that a conversation between the A-subscriber and the B-subscriber has taken place according to current Push-to-Talk practice. The sequences 15-19,25-29, 35-39 are stored in parallel in the repeat buffer RB and in the Play-Out-Buffer POB. Due to the shorter length of POB compared to RB, only the sequences 35-39 can be seen in POB in FIG. 2. The method comprises the following further steps:

The A-subscriber ends his conversation. The A-subscriber hereby indicates to the listening subscribers B that he has finished his part of the conversation.

The sequence 39 from the A-subscriber is played out from the loudspeaker LS and listened to by the B-subscriber. The B-subscriber is displeased with the quality of the sound when listening to sequence 39.

The B-subscriber presses a defined button on the KEYPAD during listening to the sequence 39. This sequence is from now on called a selected sequence 39.

The Operating Unit OU fetches an identification mark of the selected sequence 39 from the Play-out-Buffer POB.

The Operating Unit OU sends a request to the Repeat Buffer RB to set the End Repeat Pointer ERP at the corresponding sequence 39 stored in the Repeat Buffer.

The Start Repeat Pointer SRP is set by the Operating Unit OU a predefined time t backwards from the End Repeat Pointer ERP. In this example the Start Repeat Pointer is set at sequence 36, the so-called start sequence 36.

Either the B-subscriber or the operator of the PoC system has defined the time t in advance in this example. As an alternative, a number of sequences backwards from the selected data stream sequence 39 have been pre-defined instead of a time.

Replay is started from the start sequence 36.

The replay is continued and finally ends when the selected sequence 39 that is pointed out by the End Replay Pointer has been replayed.

As a variation of the above example, instead of the B-subscriber initiates the replay, the replay can take place automatically. Assume buffer under-run, i.e. that the Play-Out Buffer POB drains out due to for example "jitter" or "glitches" and that the play-out quality decreases. When decreased play-out quality is detected by the system (for example by the Operating Unit OU), the system will automatically request replay. Replay will then take place in accordance with the earlier described model. The difference in short, instead of the B-subscriber detects decreased quality and requests replay, the system automatically detects and requests.

Note that the illustration in FIG. 2 with two separate buffers for play-out and repetition is made to achieve clarity in the descriptions of the preferred embodiments. In practice, the two buffers POC and RB would preferably be implemented in the same memory storage without any multiple copies of the received sequences, by defining pointers related both to POB and to RB on the same stored sequences of data. Thus, POB would define a buffer that is a subset of the larger buffer RB. This can easily be achieved by using the Play-out Pointer PP (seen in FIG. 2 within POB) in the Repeat Buffer RB and by defining a pre-buffering level in RB with a size corresponding to the size of POB in FIG. 2. This means that the sequences 15-19,25-29,35-39 are stored like before in the repeat buffer RB and in the Play-Out-Buffer POB—but not in parallel, since POB is a subset of RB.

Figure 3:
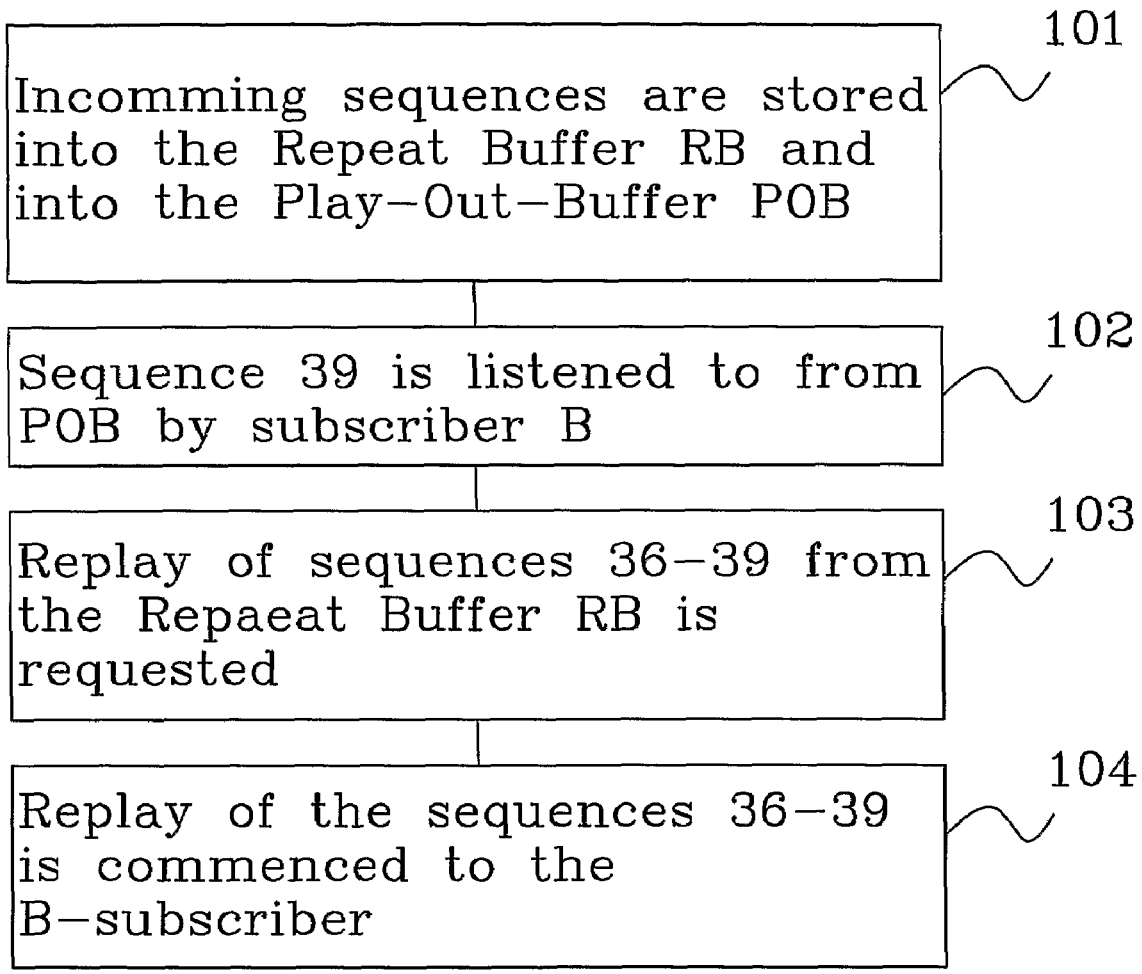
FIG. 3 shows a flowchart illustrating a method to enhance transmission quality in a Push-To-Talk system.

In FIG. 3 some of the most essential steps of the described method are shown in a flow chart. The flow chart is to be read together with the earlier shown figures. The steps are:

The incoming sequences 15-19,25-29,35-39 are stored in the Play-Out-Buffer and the Repeat buffer RB. A block 101 discloses this step in FIG. 3.

The sequence 39 is played out from the loudspeaker LS and listened to by the B-subscriber. A block 102 discloses this step in FIG. 3.

Replay is requested either automatically or by the B-subscriber. The replay is requested to end with the selected sequence 39. A block 103 discloses this step in FIG. 3. The End Repeat Pointer ERP is hereby set at the selected sequence 39 stored in the Repeat Buffer RB and the Start Repeat Pointer SRP is set at sequence 36 in the Repeat Buffer RB.

Replay is started from the sequence 36 pointed out by SRP, and the replay ends when the selected sequence 39 that is pointed out by the End Replay Pointer has been replayed. A block 104 discloses this step in FIG. 3.

Figure 4:
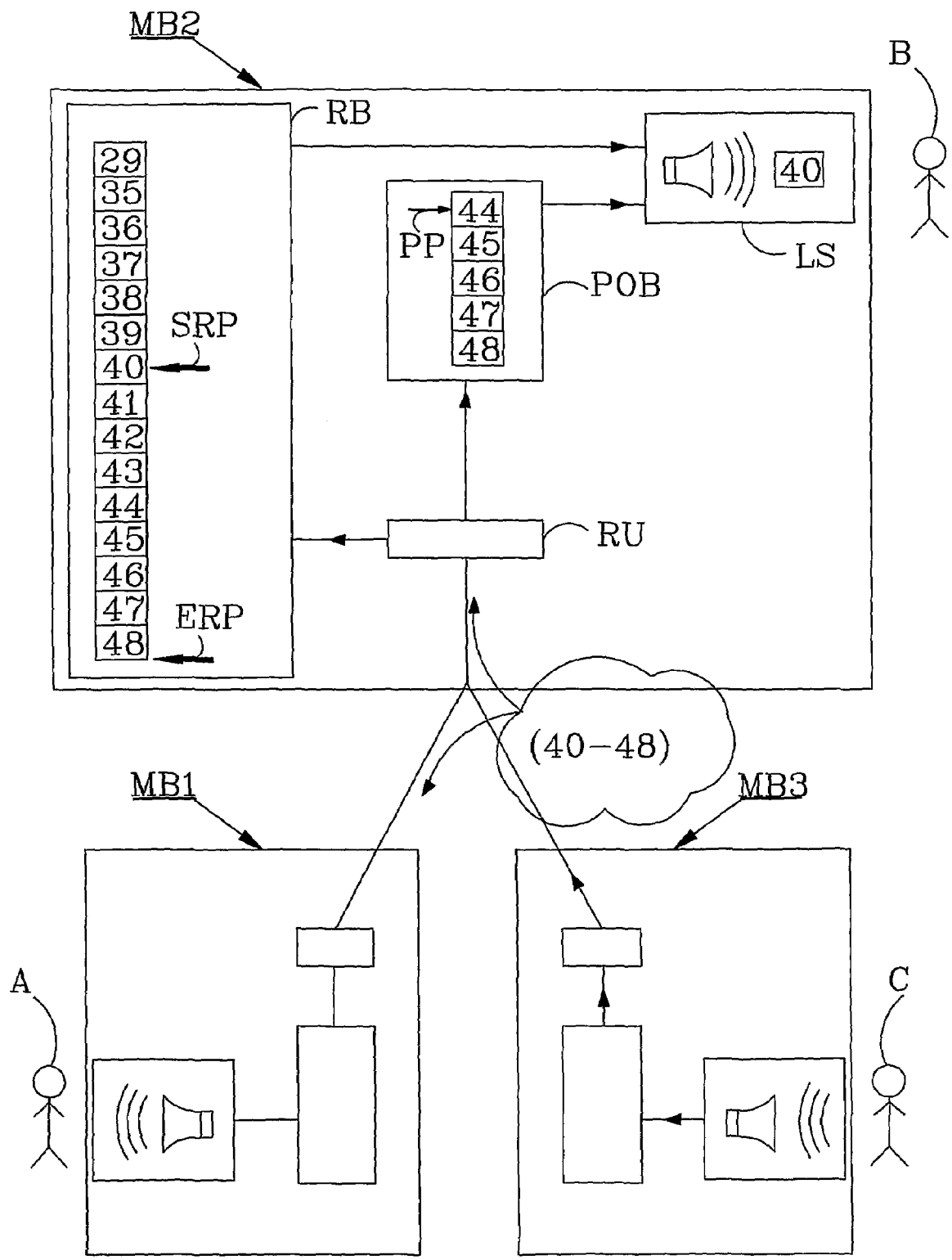
FIG. 4 shows a block schematic illustration of three mobile units in a Push-to-Talk system.

A second embodiment is shown in FIG. 4. FIG. 4 discloses the mobile units MB1, MB2 and MB3 already shown in FIG. 1. The mobile units MB1 and MB2 have already been explained when FIG. 2 was discussed. The mobile unit MB3 has in this embodiment the same function as MB1 in FIG. 2 and will not be further explained in detail. Note however that MB1 in this second embodiment is a receiver instead of a sender of sequences. The subscriber C handles the mobile unit MB3. This embodiment is a continuation of the first embodiment. After the A-subscriber has finished his conversation, the C-subscriber replies to the A-subscriber by sending sequences 40-48 to involved subscribers, i.e. to the A-subscriber and the B-subscriber. As can be seen in FIG. 4, the sequences 29,35-48 now has been stored in the Repeat Buffer RB while the sequences 44-48 are stored in the Play-Out-Buffer POB. The problem that will be solved in this embodiment is that while the B-subscriber is listening to sequences 36-39 in the repeat session, as was discussed in the first embodiment, sequences 40-48 are coming in from the C-subscriber and sequences 40-48 cannot be played out during the play-out of sequences 36-39. The solution to this problem is to enhance the replay time by moving the End-Replay-Pointer ERP from the earlier selected end sequence 39 to a new selected end sequence 48 i.e. to the last sequence received as long as replay goes on. The Operating Unit OU automatically handles the movement of the End-Replay-Pointer ERP. This movement of the pointer takes place as long as new incoming sequences are detected during reply.

Figure 5:
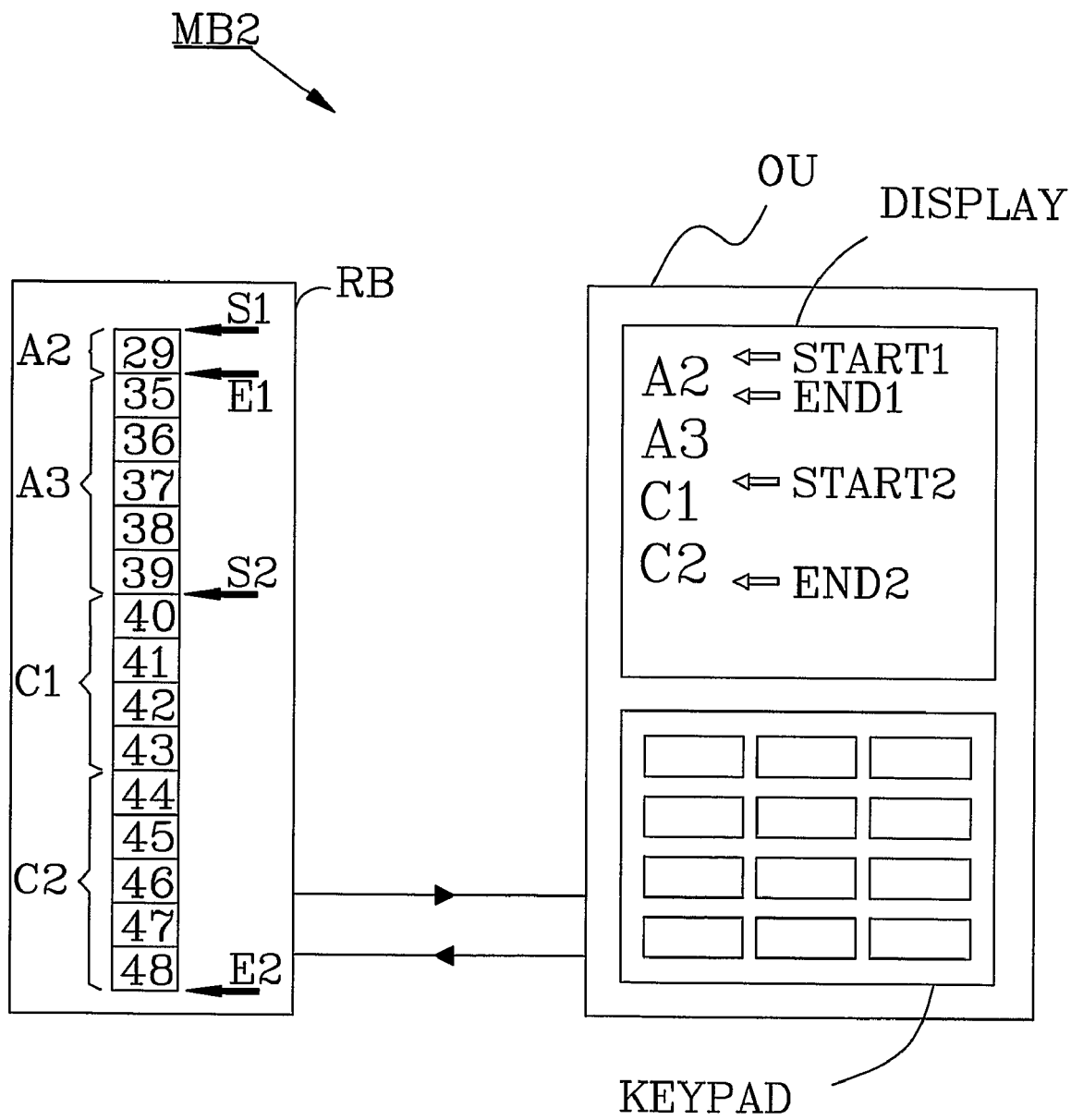
FIG. 5 shows co-operation between an Operating Unit and a Replay Buffer more in detail.

FIG. 5 discloses a variation of the above second embodiment. FIG. 5 shows the Operating Unit OU with the DISPLAY and KEYPAD more in detail. The operating unit is connected in a two-way connection to the Repeat Buffer RB. The burst A2 that comprises the sequence 29 is stored first in the Repeat Buffer (i.e. the FIFO register). A3 with sequences 35-39 comes thereafter, then C1 with the sequences 40-43 and at last C2 with the sequences 44-48. The stored bursts A2,A3, C1,C2 can be seen by the subscriber B in the display. According to this variation of the second embodiment the user is able to select bursts to be replayed by using the KEYPAD. By using the KEYPAD, the user can place arrows START1, END1, START2 and END2 at locations in the display. By placing START1 before A2, END1 after A2, START2 before C1 and END2 after C2, a first start pointer S1 is placed before sequence 29 in the Repeat Buffer. A first end pointer E1 is placed after sequence 29. A second start pointer S2 is placed before sequence 40 and a second end pointer E2 is placed after sequence 48. When the B-subscriber then requests replay, A2 will be replayed. A3 will be "jumped over" while C1 and C2 will be replayed.

Different variations are possible within the scope of the invention. The cellular system can for example be of another type than WCDMA, for example GSM, GPRS or EDGE. The invention is in other words not limited to the above described and in the drawings shown embodiments but can be modified within the scope of the enclosed claims.

The invention claimed is:

1. A method to enhance transmission quality in a Push-to-Talk system comprising a sending mobile unit and a receiving mobile unit used by a receiving subscriber, said receiving unit comprising a Play-Out-Buffer and a Repeat Buffer, said method comprising the steps of:
   sending a stream of sequences from the sending unit to the receiving unit;
   collecting the stream of sequences at said receiving mobile unit into the Repeat Buffer and into the Play-Out-Buffer, said Play-Out-Buffer having a storage size and a point for commencing play-out that provides low voice delay, and said Repeat Buffer having a storage size that provides high sound quality;
   playing out the stream of sequences from the Play-Out-Buffer to the receiving subscriber; and,
   commencing replay of a defined part of the stream of sequences collected in the Repeat Buffer.

2. The method recited in claim 1, wherein replay is requested by the receiving subscriber.

3. The method recited in claim 1, wherein said replay is commenced automatically after detection of low play-out quality from the Play-Out-Buffer.

4. The method recited in claim 1, said method further comprising the steps of:
   receiving at least one further sequence at the receiving mobile unit during replay; and,
   wherein the defined part of the stream of sequences is re-defined to further include said at least one further sequence in said step of commencing replay.

5. The method recited in claim 4, wherein said system comprises at least one additional mobile unit and wherein the at least one further sequence received during replay is sent from the additional unit.

6. The method recited in claim 1, said method further comprising the step of requesting replay to end with a selected sequence.

7. The method recited in claim 6, wherein the subscriber selects the selected sequence when listened to during said step of playing out.

8. The method recited in claim 6, wherein replay is requested to start at a predetermined amount of time preceding the selected sequence.

9. The method recited in claim 6, wherein replay is requested to start a number of sequences preceding the selected sequence.

10. An apparatus in a receiving mobile unit to enhance playback quality in a Push-to-Talk system, comprising:
    a Play-Out-Buffer and a Repeat Buffer;
    means to collect an incoming stream of sequences into the Repeat Buffer and into the Play-Out-Buffer, wherein the Play-Out-Buffer has a storage size and a point for commencing play-out that provides low voice delay, and wherein the Repeat Buffer has a storage size that provides high sound quality;
    means to play-out the incoming stream from the Play-Out-Buffer to the receiving subscriber: and,
    means to commence replay of a defined part of the incoming stream collected in the Repeat Buffer.

11. The apparatus recited in claim 10, further comprising means to request replay by the receiving subscriber.

12. The apparatus recited in claim 10, further comprising means to commence replay automatically after detection of low play-out quality from the Play-Out-Buffer.

13. The apparatus recited in claim 10, further comprising means to re-define the defined part to include a further received sequence in the replay.

14. The apparatus recited in claim 10, further comprising means to request replay to end with a selected sequence.

15. The apparatus recited in claim 14, further comprising means to request replay to start a predetermined amount of time preceding the selected sequence.

16. The apparatus recited in claim 14, further comprising means to request replay to start a number of sequences preceding the selected sequence.

17. The apparatus recited in claim 10, wherein the Play-Out-Buffer is a subset of the Repeat Buffer.

* * * * *